United States Patent Office 3,384,611
Patented May 21, 1968

3,384,611
MODIFIED TRIPHOSPHONITRILIC POLYMER COMPOSITIONS
Bernard Grushkin, Silver Spring, Md., assignor to W. R. Grace & Co., New York, N.Y., a corporation of Connecticut
No Drawing. Filed Sept. 1, 1964, Ser. No. 393,739
19 Claims. (Cl. 260—39)

ABSTRACT OF THE DISCLOSURE

Phosphonitrilic polymers such as those prepared from 2,4,6-triamido - 2,4,6 - triphenyltriphosphonitrile, can be modified by reacting with a diisocyanate. The resulting polymer can be combined with inorganic fillers to produce molding compositions.

---

The present invention relates to novel semi-inorganic polymers, and more specifically to novel organic modified triphosphonitrilic polymer compositions which find application as high temperature resistant molding compounds and ceramic binders.

It has been shown that cyclic trimeric phenyl substituted phosphonitrilic chlorides having the formula

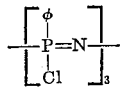

may be ammoniated with ammonia to obtain the corresponding amido derivatives having the formula

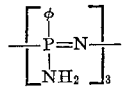

This ammoniated derivative may be deaminated at elevated temperatures to obtain a highly crosslinked inorganic type polymer which is resistant to high temperatures but which is highly insoluble and difficult to work.

To modify the ultimate properties of the inorganic type polymers, and thereby extend the applications and utilities thereof, it is frequently desirable to introduce organic type linkages and a basically inorganic polymer system.

It is therefore an object of the present invention to provide novel organic modified phosphonitrilic polymers.

It is also an object to provide novel phosphonitrilic molding compositions which may be used to prepare tough high temperature resistant molding articles.

It is another object to provide novel ceramic type molded articles which may be prepared from the presently intended phosphonitrilic molding compositions.

These and still further objects of the present invention will become readily apparent to one skilled in the art, from the following detailed description and/or specific examples.

Broadly, the present invention contemplates novel organic modified phosphonitrilic containing polymers which are formed by reacting 2,4,6-triamido-2,4,6-triphenyltriphosphonitrile and/or an amido bonded product thereof containing the following repeating unit:

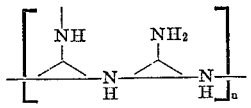

wherein

represents a 2,4,6-triphenyltriphosphonitrilic residue having 3 open valences and $n$ has a value of from about 6 to about 10 with an organic diisocyanate having the formula

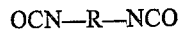

wherein R is an organic divalent radical.

More specifically I have found that by the practice of my present invention novel organic modified phosphonitrilic polymers having two similar, but different type, repeating structural units may be obtained depending on the phosphonitrilic prepolymer or intermediate used. These intermediates are (1) 2,4,6-triamido-2,4,6-triphenyltriphosphonitrile, and (2) the thermal polymerization product of 2,4,6-triamido-2,4,6-triphenyltriphosphonitrile described as (I) above.

When 2,4,6-triamido-2,4,6-triphenyltriphosphonitrile is reacted with a diisocyanate, a polymer containing the following repeating structural unit is obtained:

(II)

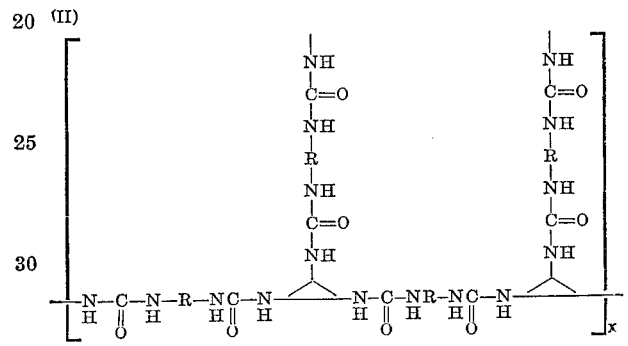

wherein $x$ has a value of from about 7 to about 10.

When the amido bonded product (I) above is reacted with diisocyanate, the following repeating structural unit is formed:

(III)

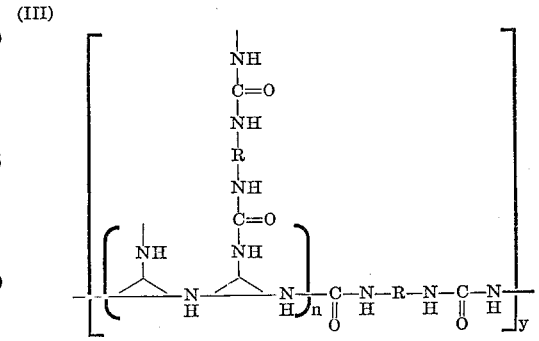

wherein $y$ has a value of from about 2 to about 3.

Polymers II and III above possess valuable high temperature properties, in that they remain stable at temperatures in excess of about 400° C. Furthermore, the present novel polymers may be advantageously combined with inorganic fillers, such as silica, glass fibers and vermiculite to form useful molding compositions for high temperature applications. Furthermore, it is found that when such molded objects are fired at temperatures in excess of from about 800° C. tough, stable ceramic type materials are readily obtained.

It is also contemplated that the presently obtained resins generally defined in Formulae II and II above, may be reacted with a solid formaldehyde yielding compound such as hexamethylenetetramine, or paraformaldehyde, to obtain highly crosslinked resinous materials. These resinous materials are readily obtained by admixing polymers having Formulae II and III above with the solid formaldehyde yielding compounds and placing the mixture in a heated mold. Thus, it is seen that the present compositions comprise valuable molding properties.

The 2,4,6-triamido-2,4,6-triphenyltriphosphonitrile used in the practice of the present invention may be readily obtained by reacting the corresponding 2,4,6-trichloro-2,4,6-triphenyltriphosphonitrile with ammonia at a temperature of from about 0 to about 35° C. preferably in the presence of an inert solvent.

The deaminated product I described above is obtained from 2,4,6 - triamido - 2,4,6-triphenyltriphosphonitrile by heating it to a temperature of from about 240 to about 270° C. until from about 50 to about 70% of the theoretical amount of ammonia contained therein has been evolved. Such a product contains from about 6 to 10 repeating phosphonitrilic units and has a molecular weight of from about 2500 to about 4000.

The diisocyanates used in the practice of the present invention possess the following structural formula $$OCN—R—NCO$$

In the above formula R represents a divalent radical such as alkylene, having from about 2 to about 6 carbon atoms, phenylene, alkyl substituted phenylene and phenylene alkylene phenylene. Typical examples of diisocyanates which may be used in the practice of the present invention are

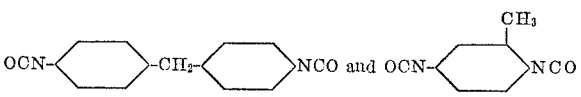

To obtain the polymers having repeating structural units II and III above, 2,4,6-triamido-2,4,6-triphenyltriphosphonitrile or deaminated product I, is reacted with the diisocyanates described above. Generally it is found that from about 1 to about 1.5 moles of diisocyanate per mole of phosphonitrilic material provides a polymer having desirable properties. This reaction is preferably carried out by thoroughly blending the phosphonitrilic with the diisocyanate either with or without a solvent and heating the admixture to a temperature of from about 50 to about 150° C. The reaction at these temperatures requires from about 30 to about 60 minutes. In the event a solvent is desired, non-reactive solvents such as chloroform, dimethoxy-ethane, dioxane and benzene may be used. It is frequently found that when the deaminated product is being reacted with diisocyanate, the reaction may conveniently be carried out in a heated mold, that is the deaminated product is blended with diisocyanate and fillers if desired, the mixture placed in a mold and heated to the curing temperatures required. This reaction may advantageously be carried out under pressures on the order of from about 1500 to about 2500 pounds per sq. in.

Where it is desired to obtain an extremely highly cross-linked product, it is found that reaction products containing the repeating structural units II and III given previously, may be further cured with hexamethylenetetramine or some other solid formaldehyde yielding substance such as paraformaldehyde. When this is desirable, from about 5 to about 10% by weight of solid formaldehyde yielding substance is admixed with the resinous product II or III and the mixture subsequently heated to a temperature of from about 200 to about 250° C. This heating (curing) may conveniently be carried out simultaneously with the molding operation.

The present polymers may be advantageously combined with inorganic fillers to produce useful molding compositions. These inorganic fillers may be finely divided silica, glass fibers, metal chips or vermiculite. The amount of filler admixed with the resin may vary from about −2 to about 3.5 parts by weight of filler per part by weight of resin used. The filler is advantageously admixed with the resin prior to reaction with diisocyanate and/or curing with hexamethylenetetramine. The preferred process for blending the filler in the event the deaminated phosphinitrilic filler product is used comprises admixing the deaminated product with the diisocyanate and the inorganic filler and thoroughly blending the admixture. This mixture may then be placed in a mold and heated to reaction temperature on the order of from about 200 to about 250° C. for about 1 to about 3 hours. In the event the 2,4,6-triamido-2,4,6-triphenyltriphosphonitrile is used in preparing the initial resin, i.e., the resin having the repeating structural unit II above, a preferred process for incorporating the filler involves first, reacting 2,4,6-triamido-2,4,6-triphenyltriphosphonitrile with a diisocyanate, then admixing the filler with hexamethylenetetramine, and finally curing the admixture at a temperature of from about 150 to about 200° C. in a heated mold.

It is found that molded objects containing inorganic fillers and the present resin possessing repeating structural units above, may be fired at temperatures of from about 800 to about 1000° C. for about 8 to about 16 hours to obtain useful ceramic type materials. These materials possess desirable high temperature properties having good physical strength.

Having described the basic aspects of the present invention, the following examples are given to illustrate embodiments thereof.

EXAMPLE I

A 10 g. sample of a deaminated phosphonitrilic product having the formula $[NP\phi NH]_x$ wherein $x$ had a value of from about 6 to about 10 was prepared by heating $[NP\phi NH_2]_3$ at a temperature of 270° C. until 85% of the available ammonia was driven off. This sample was thoroughly blended with 2 g. of

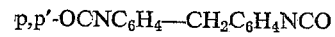

(Nacconate-300) and placed in a 1 x 1 x ¼ inch mold under pressure of 2,000 p.s.i. The temperature within the mold was raised to 250° C. and maintained thereat for 2 hours. The resultant molded article was tough and dense and remained stable at temperatures up to 400° C.

EXAMPLE II

A 10 g. sample of deaminated phosphonitrile prepared in a manner similar to that set forth in Example I were admixed with 30 g. each of silica fibers and glass fibers and subsequently molded by the same procedure set forth in Example I. The resultant articles were tough and dense in appearance and remained stable at temperatures up to 400° C.

EXAMPLE III

Ten g. of deaminated phosphonitrile obtained by the procedure set forth in Example I was dissolved in 250 ml. of chloroform containing 4 g. of the aforementioned Nacconate-300. After refluxing for 1 hr. at 60° C., a solid precipitated. This solid was recovered by filtration and washed with chloroform. This material was deemed to possess the repeating structural unit illustrated in Formula II above.

EXAMPLE IV

Ten g. of the reaction product obtained in Example III was admixed with 1 g. of hexamethylenetetramine and the mixture cured in a press under 2,000 pound per sq. in. at a temperature of 250° C. for 2 hrs. The resultant molded article possessed a dense smooth appearance and remained stable at temperatures up to 400° C.

EXAMPLE V

A 10 g. sample of the deaminated phosphonitrilic-Nacconate-300 product obtained in Example IV was admixed with 35 g. of silica fiber and 1 g. of hexamethylenetetramine and subsequently cured in a mold at 250° C. for 2 hrs. A tough, high density material was obtained which remained stable at temperatures up to about 400° C.

Example VI

Twenty-five g. of 2,4,6-triphenyl-2,4,6-triamidotriphosphonitrile was admixed with 22 g. of the aforementioned Nacconate-300 in the presence of 500 ml. of chloroform. The mixture was heated at reflux for about 3 hrs. A precipitate formed which was deemed to possess the structural repeating unit described in Formula II above.

Example VII

Ten g. of the product obtained in Example VI were admixed with 1.0 g. hexamethylenetetramine and heated in a mold at a temperature of 250° C. for 2 hrs. This material was found to possess a dense, tough structure which remained stable at temperatures of 400° C.

Example VIII

Ten g. of the 2,4,6-triamido-2,4,6-triphenyltriphosphonitrile-Nacconate-300 reaction product obtained in Example VII was admixed with 2 g. of paraformaldehyde and 30 g. of silica fibers. The mixture was placed in a mold and cured at 250° C. for 2 hrs. under 2,000 lbs. per sq. in. pressure. The resultant article was smooth and dense in appearance and remained stable heated at temperatures up to 400° C.

Example IX

The molded articles obtained in the above examples were fired at 980° C. for about 16 hours. Tough, ceramic type materials were obtained which possessed good physical and high temperature properties.

The above examples clearly indicate that novel and useful organic modified phosphonitrilic derivatives may be obtained by following the teachings of the present invention.

I claim:

1. A polymer containing the structural unit selected from the group consisting of (II)

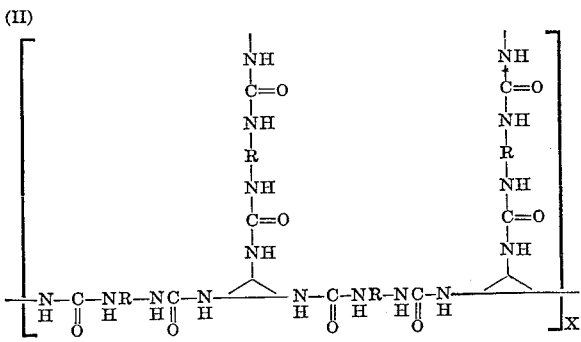

and (III)

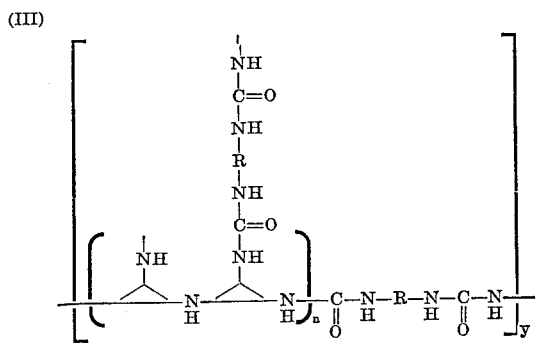

wherein

represents a 2,4,6-triphenyltriphosphonitrilic ring having 3 open valences, R is a divalent organic radical selected from the group consisting of alkylene having 2 to 6 carbon atoms, phenylene, alkyl substituted phenylene and phenylene alkylene phenylene, said organic radical derived from an organic diisocyanate having the structural formula OCN—R—NCO, $n$ has a value of from about 6 to about 10, $y$ has a value of from about 2 to about 3, said polymer having a molecular weight of from about 2500 to about 4000.

2. A process for preparing polymers selected from the group consisting of (II)

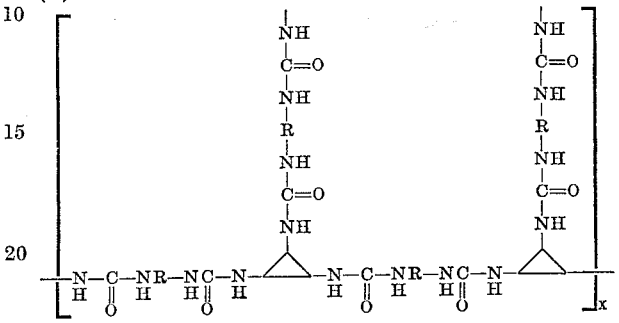

and (III)

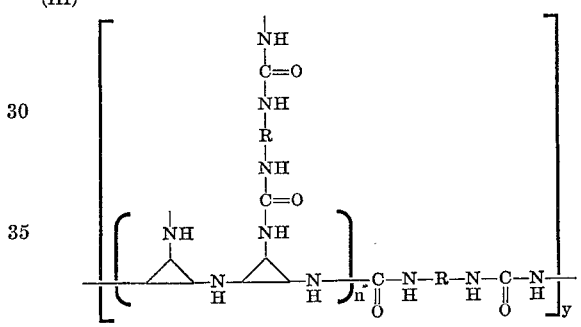

wherein

represents a 2,4,6-triphenyltriphosphonitrilic ring having 3 open valences, R is a divalent organic radical selected from the group consisting of alkylene having 2 to 6 carbon atoms, phenylene, alkyl substituted phenylene and phenylene alkylene phenylene, said organic radical derived from an organic diisocyanate having the structural formula OCN—R—NCO, $n$ has a value of from about 6 to about 10, $y$ has a value of from about 2 to about 3, said polymer having molecular weight of from about 4,000 to about 10,000 which comprises reacting a prepolymer selected from the group consisting of 2,4,6-triamido-2,4,6-triphenyltriphosphonitrile and a compound of the formula:

(I)

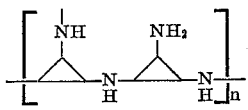

wherein

represents a 2,4,6-triphenyltriphosphonitrilic ring having 3 open valences, and $n$ has a value of from about 6 to about 10 with an organic diisocyanate having the structural formula OCN—R—NCO at a temperature of from about 50 to about 150° C.

3. The process of claim 2 wherein from about 1 to about 1.5 moles of said diisocyanate is reacted per mole of said prepolymer.

4. A highly crosslinked polymer obtained by reacting a polymer containing the structural unit selected from the group consisting of

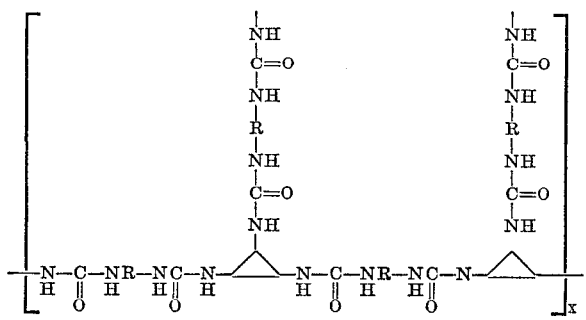

and

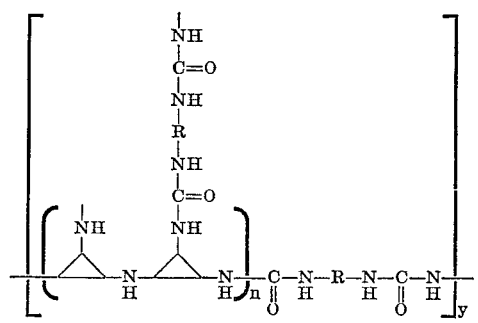

wherein

represents a 2,4,6-triphenyltriphosphonitrilic ring having 3 open valences, R is a divalent organic radical selected from the group consisting of alkylene having 2 to 6 carbon atoms, phenylene, alkyl substituted phenylene and phenylene alkylene phenylene, said organic radical derived from an organic diisocyanate having the structural formula OCN—R—NCO, $n$ has a value of from about 6 to about 10, $y$ has a value of from about 2 to about 3, said polymer having molecular weight of from 4,000 to 10,000 with from about 0.05 to about 0.1 part by weight of a formaldehyde yielding compound at a temperature of from about 200 to about 250° C.

5. The polymer of claim 4 wherein said formaldehyde yielding compound is hexamethylenetetramine.

6. The compound of claim 4 wherein said formaldehyde yielding compound is paraformaldehyde.

7. A resinous molding composition containing from about 2 to about 3.5 parts by weight of an inorganic filler per part by weight of a polymer containing the structural units selected from the group consisting of

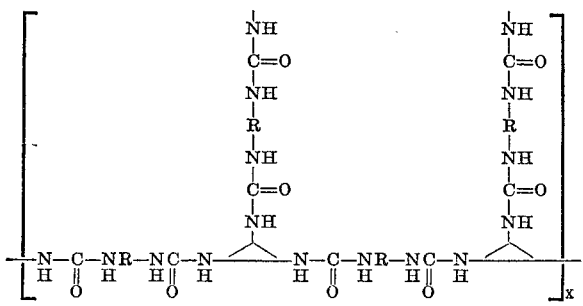

and

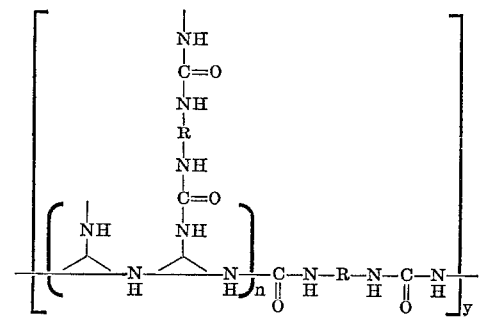

wherein

represents a 2,4,6-triphenyltriphosphonitrilic ring having 3 open valences, R is a divalent organic radical selected from the group consisting of alkylene having 2 to 6 carbon atoms, phenylene, alkyl substituted phenylene and phenylene alkylene phenylene, said organic radical derived from an organic diisocyanate having the structural formula OCN—R—NCO, $n$ has a value of from about 6 to about 10, $y$ has a value of from about 2 to about 3, said polymer having a molecular weight of from 4,000 to 10,000.

8. The molding composition of claim 7 wherein said inorganic filler is finely divided silica.

9. The molding composition of claim 7 wherein said inorganic filler is silica fibers.

10. The resinous molding compound of claim 7 which contains from about 0.05 to about 0.1 part by weight of a formaldehyde yielding substance.

11. The composition of claim 10 wherein said formaldehyde yielding substance is hexamethylenetetramine.

12. The composition of claim 10 wherein said formaldehyde yielding substance is paraformaldehyde.

13. A process for forming high temperature, stable, molded articles which comprises admixing from about 0.8 to about 1.0 part by weight of a prepolymer selected from the group consisting of 2,4,6-triamido-2,4,6-triphenyltriphosphonitrile and

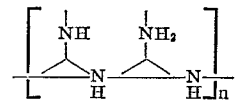 (I)

wherein

represents a 2,4,6-triphenyltriphosphonitrilic residue having 3 open valences and $n$ has a value of from about 6 to about 10 with from about 2 to about 3.5 parts by weight of an inorganic filler and from about 0.2 to about 1.0 part by weight of an organic diisocyanate having the structural formula OCN—R—NCO per part by weight of said prepolymer and heating the mixture to a temperature of from about 200 to about 250° C.

14. The composition of claim 13 wherein the inorganic filler is finely divided silica.

15. The composition of claim 13 wherein the inorganic filler is silica fibers.

16. A process for preparing high temperature stable molded articles which comprises admixing a polymer containing a structural unit selected from the group consisting of

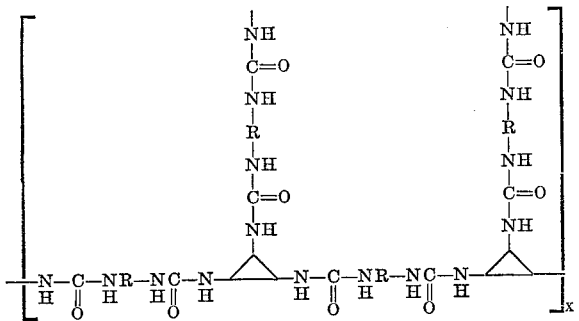

and

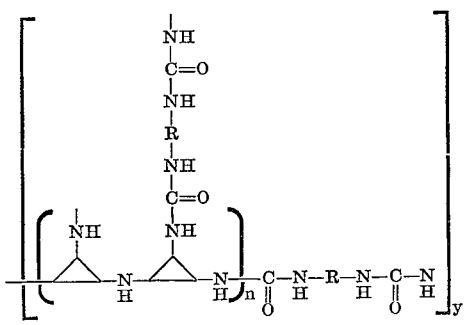

wherein

represents a 2,4,6-triphenyltriphosphonitrilic ring containing 3 open valences, R is a divalent organic radical selected from the group consisting of alkylene having 2 to 6 carbon atoms, phenylene, alkyl substituted phenylene and phenylene alkylene phenylene, said organic radical derived from an organic diisocyanate having the structural formula OCN—R—NCO, $n$ has a value of from 6 to 10, $y$ has a value of from about 2 to about 3, with from about 2 to about 3.5 parts by weight of an inorganic filler and from about 0.5 to about 0.10 part by weight of a formaldehyde yielding substance selected from the group consisting of paraformaldehyde and hexamethylenetetramine, from about 0.1 to about 0.5 part by weight of an organic diisocyanate having the structural formula

OCN—R—NCO and heating the mixture to a temperature of from about 200 to about 250° C.

17. The process of claim 16 wherein said inorganic filler is finely divided silica.

18. The process of claim 16 wherein said inorganic filler is silica fibers.

19. A tough, stable ceramic material obtained by firing a molded object obtained by the process set forth in claim 13 at a temperature in excess of 800° C.

References Cited

UNITED STATES PATENTS

| | | | |
|---|---|---|---|
| 3,008,799 | 11/1961 | Lovelace et al. | 23—14 |
| 3,048,631 | 8/1962 | Audrieth et al. | 260—551 |
| 3,197,464 | 7/1965 | Ottman et al. | 260—551 |

MORRIS LIEBMAN, *Primary Examiner.*

JULUIS FROME, *Examiner.*

S. L. FOX, *Assistant Examiner.*